(12) United States Patent
Bouscaren et al.

(10) Patent No.: US 11,434,840 B2
(45) Date of Patent: Sep. 6, 2022

(54) MAGNETIC SPEED SENSOR WITH INCREASED RESOLUTION

(71) Applicant: Continental Automotive GmbH, Hannover (DE)

(72) Inventors: Denis Bouscaren, Toulouse (FR); Thierry Chauchard, Toulouse (FR)

(73) Assignee: Continental Automotive GmbH

( * ) Notice: Subject to any disclaimer, the term of this patent is extended or adjusted under 35 U.S.C. 154(b) by 0 days.

(21) Appl. No.: 17/431,877

(22) PCT Filed: Feb. 25, 2020

(86) PCT No.: PCT/EP2020/054941
§ 371 (c)(1),
(2) Date: Aug. 18, 2021

(87) PCT Pub. No.: WO2020/173960
PCT Pub. Date: Sep. 3, 2020

(65) Prior Publication Data
US 2022/0145814 A1 May 12, 2022

(30) Foreign Application Priority Data

Feb. 26, 2019 (FR) ..................................... 1901956

(51) Int. Cl.
*F02D 41/00* (2006.01)
*G01D 5/244* (2006.01)
*F02D 13/02* (2006.01)

(52) U.S. Cl.
CPC ....... *F02D 41/009* (2013.01); *F02D 13/0223* (2013.01); *G01D 5/24409* (2013.01); *F02D 2200/101* (2013.01)

(58) Field of Classification Search
CPC ............... F02D 41/009; F02D 13/0223; F02D 2200/101; G01D 5/24409
(Continued)

(56) References Cited

U.S. PATENT DOCUMENTS

| 5,317,614 A | 5/1994 | Davis et al. |
| 2008/0172160 A1 | 7/2008 | Jiang et al. |

(Continued)

FOREIGN PATENT DOCUMENTS

| FR | 3044087 A1 | 5/2017 |
| FR | 3059717 A1 | 6/2018 |

OTHER PUBLICATIONS

International Search Report and Written Opinion for International Application No. PCT/EP2020/054941, dated Apr. 24, 2020, 9 pages.

(Continued)

*Primary Examiner* — Hai H Huynh
(74) *Attorney, Agent, or Firm* — RatnerPrestia

(57) ABSTRACT

A method for increasing a resolution of a magnetic sensor for an internal combustion engine of a motor vehicle. The sensor delivers an electrical synchronization signal having successive, spaced-apart crenels, one of the rising or falling edges of which corresponds to a respective angle of rotation of the element of the engine. A synchronization voltage range is interposed between an upper voltage modulation range above and a lower voltage modulation range below the upper and lower voltage of the synchronization range, respectively, the electrical signal in each of the lower and upper modulation ranges being modulated so as to include additional crenels, which are supplementary to the crenels of the synchronization signal, corresponding to periodic clock crenels with a period dependent on engine speed, an angle of rotation being identified by one of the rising or falling edges of each additional crenel.

11 Claims, 2 Drawing Sheets

(58) Field of Classification Search
USPC ........ 123/299, 300, 436, 472, 490; 701/103, 701/110; 73/114.25, 114.26
See application file for complete search history.

(56) References Cited

U.S. PATENT DOCUMENTS

2018/0356256 A1     12/2018  Mirassou
2022/0034685 A1*    2/2022   Gouzenes .......... G01D 5/24495

OTHER PUBLICATIONS

International Search Report and Written Opinion for International Application No. PCT/EP2020/054941, dated Apr. 24, 2020 (French), 13 pages.
English Translation of Written Opinion for International Application No. PCT/EP2020/054941, dated Apr. 24, 2020, 8 pages.

* cited by examiner

MAGNETIC SPEED SENSOR WITH INCREASED RESOLUTION

CROSS REFERENCE TO RELATED APPLICATIONS

This application is the U.S. National Phase Application of PCT International Application No. PCT/EP2020/054941, filed Feb. 25, 2020, which claims priority to French Patent Application No. 1901956, filed Feb. 26, 2019, the contents of such applications being incorporated by reference herein.

FIELD OF THE INVENTION

The present invention relates to a magnetic sensor for detecting the speed of an element driven by an internal combustion engine with increased resolution, to a method for increasing the resolution of a magnetic sensor and to a method for controlling a function associated with an internal combustion engine requiring the function to be implemented to be controlled or activated at angles of rotation of the driven element.

Non-limitingly, such a magnetic-field sensor may be a sensor of the magnetic field of a camshaft or crankshaft by way of driven element associated with the internal combustion engine.

BACKGROUND OF THE INVENTION

Camshaft sensors are used in a motor vehicle to determine the position of the various cylinders in the combustion cycle of the internal combustion engine, i.e. whether each cylinder is in intake mode, in compression mode, in combustion mode or in exhaust mode.

Likewise, crankshaft sensors are used to track the rotation of the crankshaft, the association of these two sensors allowing the internal combustion engine to be synchronized. The magnetic-field sensors that are the subject of an aspect of the present invention may also perform other functions, such as, for example, when used as a knock sensor.

The synchronization of an internal combustion engine consists in identifying with precision the position of the moving parts of the engine assembly and associated elements, namely each piston housed in one engine cylinder, the crankshaft, and the camshaft that is responsible for managing intake into and exhaust from the combustion chamber given the type (two-stroke or four-stroke) of engine, in order to allow the engine control electronics, which are integrated in an electronic control unit, to manage the engine with the accuracy and precision required for its optimal operation.

Therefore, an internal combustion engine must be "phased" in order to determine and optimize the best moment to burn the fuel in the cylinder, this allowing, inter alia, emissions and fuel consumption to be optimized.

Phasing is generally carried out by combining two pieces of information delivered by sensors associated with a crankshaft and a camshaft, respectively.

These sensors comprise a magnetic-field generator (for example: a permanent magnet), a means for detecting the magnetic field (for example a Hall-effect cell, magnetoresistive (MR) cell, giant magnetoresistive (GMR) cell, etc.) and an electronic circuit for processing the signal received by the means for detecting the magnetic field. These sensors, which are called active sensors, deliver a digital signal to a central computer for processing, the computer forming part of an electronic control unit.

As known, magnetic-field sensors are associated with a target secured to a camshaft. This target takes the form of a disk, the periphery of which is toothed. These teeth have the same height but different spacings or recesses and lengths, so as to encode the position of the cylinders in the combustion cycle of a motor-vehicle internal combustion engine.

The means for detecting the magnetic field, which is present in the sensor, detects the passage of the teeth of the target in front thereof and the resulting signal allows the position of each cylinder with respect to the combustion cycle of the engine to be determined, in a manner known per se.

In order to determine the position of each cylinder in the engine cycle, the curve of the variations in the magnetic field perceived by the magnetic-field sensor during one revolution of the target is observed. This curve exhibits a succession of crenels, each corresponding to one tooth of the target. For example, for a camshaft sensor, by measuring the spacing between each crenel and the duration of each thereof, it is possible to determine the position of each cylinder with respect to the engine combustion cycle.

The electrical signal generated by the sensor changes (high or low) state when the magnetic signal crosses a predetermined switching threshold proportional to its amplitude. To this end, this switching threshold is preferably set to 75% of the amplitude, this corresponding to an optimum with respect to the precision between electrical edges and mechanical edges for most existing targets. This threshold may however, for example, vary between 70% and 80% depending on the precision with which it is desired to determine the time of passage of each edge defining one tooth.

With reference to FIG. 1, this figure shows the profile of a tooth DC of a mechanical target above two amplitude signals as a function of time. The configuration of the tooth of the mechanical target is of rectangular shape, a detection plateau being generated thereby, such a plateau being introduced for each tooth of the target, the target possibly being circular and the teeth DC possibly being distributed circumferentially on a periphery of the target.

The first signal resulting from the detection of the tooth is the magnetic detection signal Smag effected by the magnetic-field sensor. This magnetic detection signal Smag on the whole traces the profile of the tooth DC, varying from 0 to 100% when a tooth is detected, one of the differences being that the rising edge of the detection signal is less abrupt than the profile of the tooth DC, and another difference being that the detection plateau of the magnetic detection signal Smag does not remain constant during detection, unlike the plateau of the tooth DC.

To make the detection interval of the magnetic detection signal Smag equivalent to the plateau of the tooth, a switching threshold SC, which may be equal between 70 or 80% of the maximum detection amplitude, 0% corresponding to no detection and 100% corresponding to complete detection, is established.

The second signal is an electrical output signal Ss delivered by the magnetic-field sensor to an electronic control unit, it corresponding to an indication that the switching threshold SC has been reached, and having a plateau representing the time for which the magnetic signal Smag remains above this switching threshold SC.

Internal-combustion-engine-related control or command functions are increasingly being developed that require, to implement function-specific control and/or activation, the current angle of rotation of an element driven by the internal combustion engine to be known.

This is the non-limiting case for a variable-valve-timing (VVT) function. An internal combustion engine capable of implementing a VVT function comprises, for each of its cylinders, at least one intake valve and at least one exhaust valve, and has the ability to link the opening of the intake and exhaust valves.

A VVT function may thus modify valve timing, i.e. the time the valves spend open, depending on engine speed, on load and on the vehicle-acceleration requirement, which is transmitted, from the driver to the electronic control unit, via a depression of the accelerator pedal.

Such a VVT mechanism allows the synchronization of the valves to be controlled depending on certain engine operating conditions, these conditions possibly varying as a vehicle with such an internal combustion engine is driven. Thus, it is possible to improve the fuel consumption of the vehicle as well as the exhaust emissions of the vehicle.

More complex VVT functions with, per cylinder, two intake valves and two exhaust valves, may also be employed.

Timing is varied via the action of phase variators both on the intake and on the exhaust of the engine. In a manner known per se, the phase variators are controlled via the application of position setpoints that are defined to reflect various combustion modes, and that are then modified to reflect a plurality of parameters. Such a variation in timing allows gas exchange to be controlled and provides an opportunity to optimize combustion.

The angle-of-rotation indications delivered by a magnetic sensor, which is for example associated with a camshaft, are sometimes insufficient as regards implementation of such a function associated with the internal combustion engine. This mainly applies at low engine speeds, the value of these low engine speeds depending on the engine used, and for example being lower than 3,000 revolutions per minute. At these low engine speeds, there are not enough measured angles of rotation available.

The problem behind the present invention is, for a magnetic-field sensor associated with a toothed target borne by an element driven by an internal combustion engine, with a view to synchronizing this internal combustion engine with an electronic control unit in a motor vehicle, that of ensuring that this sensor also delivers additional identifications of angle-of-rotation positions supplementary to those detected via the passage of the target in front of the sensor.

SUMMARY OF THE INVENTION

To this end, an aspect of the present invention relates to a method for increasing a resolution of a magnetic sensor for an internal combustion engine of a motor vehicle, a target comprising an alternating succession of teeth and of recesses being associated with an element driven by the internal combustion engine and the magnetic-field sensor detecting magnetic-field variations induced by a passage of the teeth of the target in proximity to the sensor, by generating a magnetic signal, then periodically delivering an electrical output signal, called the synchronization signal, in a synchronization voltage range, to an electronic control unit with a view to synchronizing the internal combustion engine, the electrical synchronization signal comprising successive, spaced-apart crenels, one of the rising or falling edges of which corresponds to a beginning or an end of the respective passage of a tooth of the target, which occurs at a respective angle of rotation of the element of the engine, noteworthy in that the synchronization voltage range is interposed between an upper voltage modulation range above and a lower voltage modulation range below the upper and lower voltage of the synchronization range, respectively, the electrical signal in each of the lower and upper modulation ranges being modulated so as to comprise additional crenels, which are supplementary to the crenels of the synchronization signal, corresponding to periodic clock crenels with a period dependent on engine speed, an angle of rotation being identified by one of the rising or falling edges of each additional crenel.

The technical effect is to increase the resolution of a magnetic sensor associated with a toothed target borne by the element of which the rotation is to be detected and which is driven by the internal combustion engine, this sensor being a so-called incremental sensor. This is achieved without modification of the engine synchronization software installed on the electronic control unit and is therefore implementable with existing electronic control units without specific adaptation.

The parameters of the synchronizing phase remain unchanged and the processing of said parameters remains the same in the electronic control unit.

With a prior-art sensor, at low engine speed, sufficient angles of rotation of the tracked element were not identified for implementation of a related function associated with the internal combustion engine to be guaranteed, the number of angles of rotation identified in the synchronization range being insufficient to activate or control this function. The clock crenels of the lower and upper modulation phases allow the identified number of angles of rotation of the tracked element to be increased.

As a result, the signal modulation in the synchronization range remains identical to that currently used in an incremental magnetic sensor according to the prior art, this allowing compatibility with existing architectures and with the electronic control unit to be maintained.

Advantageously, for a total voltage range of the electrical signal varying from 0 to a maximum voltage, a voltage in the middle of the synchronization range is equal to half the maximum voltage and a voltage in the middle of the lower modulation range is equal to one-third of the maximum voltage while a voltage in the middle of the upper modulation range is equal to two-thirds of the maximum voltage.

The solution of an aspect of the present invention consists in employing an output protocol in which three ranges, i.e. an unchanged synchronization range and two modulation ranges, are used. It might be possible to provide only a single lower or upper modulation range, but this is not preferred.

The lower and upper modulation ranges are defined by the voltage levels used to modulate the output signal in these ranges. There is therefore no interference between a synchronization range and the modulation ranges. The maximum voltage is the voltage with which the magnetic-sensor output is biased by the electronic control unit.

Advantageously, above a predetermined speed of rotation of the element driven by the engine, the lower and upper phases of the signal are suppressed and the synchronization range occupies the entire voltage range.

The benefit of an aspect of the present invention is obtained essentially at low engine speeds, such engine speeds implying a low number of identifications of angles of rotation of the tracked element driven by the internal combustion engine, especially when the target comprises only one tooth. Implementation of an aspect of the present invention at relatively high engine speeds, for example speeds above 3,000 rpm, may not be necessary.

In addition, this makes it possible to increase the compatibility of the sensor with existing interpretation systems, which are especially installed on the electronic control unit. This may be achieved by using a programmable read-only memory forming a register in the electronic control unit.

Advantageously, the rising or falling edges of the additional crenels of each of the lower and upper modulation ranges are determined by linear interpolation based on a period between two rising edges or two falling edges of two successive crenels in the synchronization voltage range.

The signal modulation carried out in the modulation regions will be, for an incremental magnetic target sensor, carried out either via a linear interpolation at constant speed or carried out using target-specific coding.

Advantageously, an obtainment of the rising or falling edges of the additional crenels is dependent on a speed of rotation of the mechanical target, which speed is computed between two equidistant falling or rising mechanical edges of two successive crenels in the synchronization voltage range.

An aspect of the invention also relates to a method for driving a function related to the internal combustion engine, the method requiring the function to be implemented to be controlled or activated at angles of rotation of the element driven by the engine, noteworthy in that the angles of rotation are identified by the crenels of the synchronization range and the additional crenels of the lower and upper modulation ranges during an implementation of such a method for increasing a resolution of a sensor.

As previously mentioned, the aim of an aspect of the present invention is identification of a higher number of angles of rotation via the presence of additional clock signals that are supplementary to the electrical synchronization signal. This makes it possible to improve control and activation of the function to be implemented.

Advantageously, the function is a variable-valve-timing function that regulates an intake-air flow rate depending on an angle of rotation of at least one camshaft by way of an element driven by the engine.

An aspect of the invention also relates to an assembly of at least one magnetic-field sensor, for an internal combustion engine of a motor vehicle, and of an electronic control unit, said at least one sensor interacting with a target comprising an alternating succession of teeth and of recesses, which target is associated with an element of the internal combustion engine, and said at least one magnetic-field sensor comprising means for detecting magnetic-field variations induced by the passage of the teeth of the target in proximity to said at least one sensor, comprising means for generating a magnetic signal from said variations and means for periodically transmitting an electrical output signal to the electronic control unit with a view to synchronizing the internal combustion engine, the assembly implementing such a method for increasing a resolution of a magnetic sensor or such a driving method, noteworthy in that said at least one sensor comprises means for creating, for its electrical output signal, two, lower and upper, modulation ranges that bound a synchronization range, and means for creating, in the electrical signal of each of the lower and upper modulation ranges, additional crenels, which are supplementary to the crenels of the synchronization signal, the additional crenels being periodic clock crenels with a period dependent on engine speed, and means for identifying the angles of rotation of the element corresponding to a rising or falling edge of each of the crenels of the synchronization signal and of the additional crenels, the electronic control unit comprising means for receiving the electrical signal of each of the lower and upper modulation ranges, and the angles of rotation identified by the sensor.

Advantageously, the electronic control unit comprises means for controlling or activating a function implemented at the identified angles of rotation.

An aspect of the present invention lastly relates to a motor vehicle, noteworthy in that it comprises such an assembly of at least one magnetic-field sensor and of an electronic control unit.

BRIEF DESCRIPTION OF THE DRAWINGS

Other features and advantages of aspects of the invention will become more apparent upon reading the following description. This description is purely illustrative and must be read with reference to the attached drawings, in which.

Figure 1:
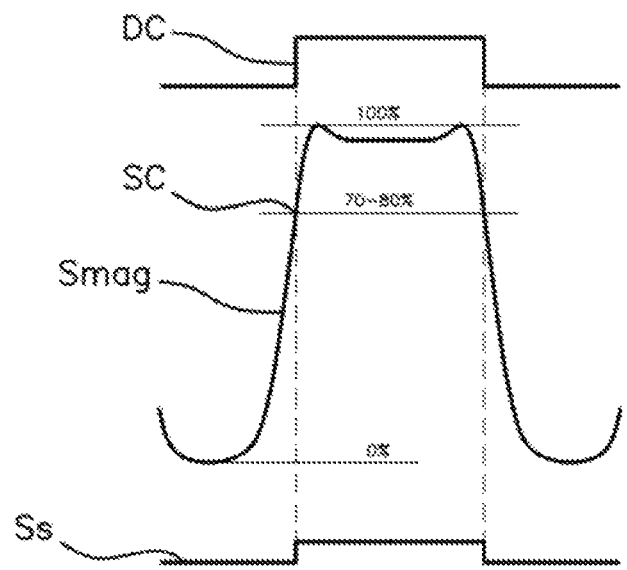
FIG. 1, consists of a group of three curves showing the configuration of a tooth of a mechanical target for a magnetic-field sensor, the target-detection magnetic signal delivered by the magnetic-field sensor and the electrical output signal delivered by the magnetic-field sensor to an external entity, especially an electronic control unit, respectively, the magnetic-field sensor possibly being intended for an internal combustion engine and being common to the prior art and to an aspect of the present invention.

DETAILED DESCRIPTION OF THE
PREFERRED EMBODIMENTS

Below, reference is made to all the figures in combination. As regards recognition of designated reference numerals, when reference is made to one or more specific figures, these figures should be considered in combination with the other figures.

Figure 2:
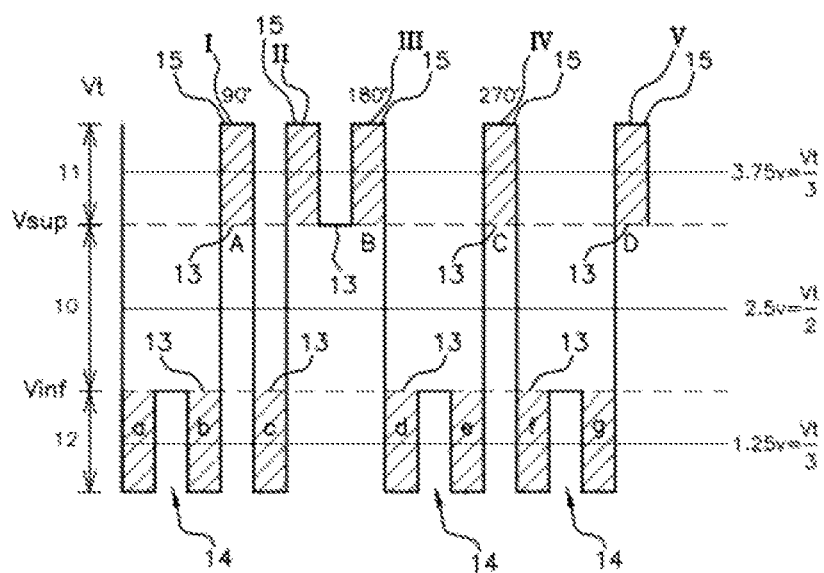
FIG. 2 shows a voltage range with a synchronization range interposed between an upper modulation range and a lower modulation range with a view to increasing the resolution of the sensor with respect to the identification of angles of rotation of the tracked element driven by an internal combustion engine, in accordance with the resolution-increasing method according to an aspect of the present invention.

With reference to all the figures, and especially to FIGS. 1 and 2, an aspect of the present invention relates to a method for increasing a resolution of a magnetic sensor for an internal combustion engine of a motor vehicle, the sensor possibly being a camshaft sensor or a crankshaft sensor.

For such a magnetic sensor, a target comprising an alternating succession of teeth DC and of recesses is associated with an element driven by the internal combustion engine, for example the camshaft or crankshaft.

The magnetic-field sensor detects magnetic-field variations induced by a passage of the teeth DC of the target in proximity to the sensor, by generating a magnetic signal Smag, then periodically delivering an electrical output signal Ss, called the synchronization signal, in a synchronization voltage range 10, to an electronic control unit with a view to synchronizing the internal combustion engine.

As may be seen in FIG. 2, the electrical synchronization signal comprises successive, spaced-apart crenels 13, corresponding to a respective passage of a tooth of the target.

The successive and spaced-apart crenels 13 of the synchronization range 10 have rising or falling edges that correspond to a beginning or an end of the respective passage of a tooth of the target, which occurs at a respective angle of rotation of the element of the engine.

According to an aspect of the invention, the synchronization voltage range 10 is interposed between an upper voltage modulation range 11 above and a lower voltage modulation range 12 below the upper voltage Vsup and lower voltage Vinf of the synchronization range 10, respectively.

The electrical signal in each of the lower and upper modulation ranges 12, 11 is modulated so as to comprise additional crenels 14, which are supplementary to the crenels 13 of the signal of the synchronization range 10, corresponding to periodic clock crenels with a period dependent on engine speed. It is thus possible to identify one angle of rotation for each of the rising or falling edges of each additional crenel 14.

FIG. 2 shows a voltage range according to an aspect of the present invention, comprising a synchronization voltage range 10 interposed between an upper voltage modulation range 11 and a lower voltage modulation range 12.

The electrical signal in each of the lower and upper modulation ranges 12, 11 is modulated so as to comprise additional crenels 14, which are supplementary to the crenels 13 of the synchronization signal, corresponding to a defined angle of rotation of the element driven by the internal combustion engine.

Let Vt, equal for example to 5 volts, be the maximum electrical-signal voltage in all the ranges, for a total electrical-signal voltage range varying from 0 to the maximum voltage Vt, the voltage in the middle of the synchronization range 10 may be equal to half the maximum voltage Vt, i.e. to 2.5 volts for a non-limiting maximum voltage Vt of 5 volts.

According to an aspect of the invention, the voltage in the middle of the lower modulation range 12 may be equal to one third of the maximum voltage Vt, i.e. for example to 1.25 volts. The voltage in the middle of the upper modulation range 11 may be equal to two thirds of the maximum voltage Vt, i.e. to 3.75 volts for a maximum voltage of 5 volts.

The synchronization range 10 comprises, non-limitingly, four crenels A, B, C, D, the plateau of which reaches the maximum voltage value of the synchronization range 10 and four crenels (interposed between the crenels A, B, C, D) the plateau of which reaches the minimum voltage value of the synchronization range. The lower modulation range 12 may comprise seven crenels (referenced 14) a, b, c, d, e, f and g, respectively, and the upper modulation range 11 may comprise five crenels (referenced 15) I, II, III, IV and V, respectively, in the extension of the crenels A, B, C, D of the synchronization range 10, with one crenel of the synchronization range split into two additional crenels (referenced II and III) in the upper modulation range in the middle of this figure. Similarly, there are three crenels of the synchronization range 10 that are each split into two additional crenels (referenced a, b, d, e, f, and g) in the lower modulation range.

Angles of rotation of the element bearing the target have been annotated in FIG. 2; they are, for example, 0, 90, 180 and 270°. The presence of the additional crenels 14 of the lower modulation range 12 and of the additional crenels 15 of the upper modulation range 11, in addition to the crenels 13 of the synchronization range 10, allows the resolution of the magnetic sensor to be increased.

Figure 3:
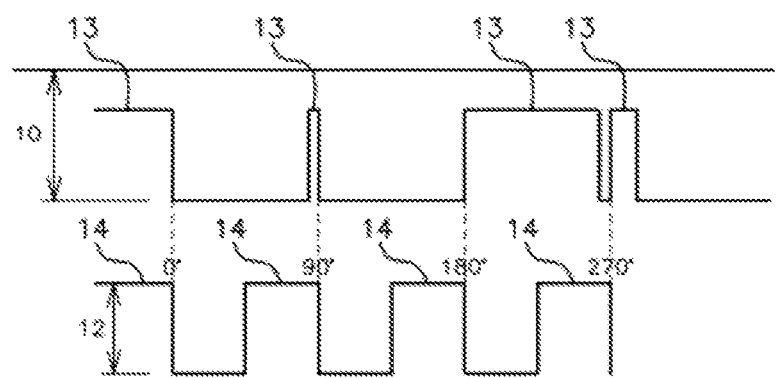
FIG. 3 shows a comparison between the crenels of a synchronization range and the additional crenels of a lower or upper modulation range in the implementation of a method according to an aspect of the present invention.

FIG. 3 shows crenels 13 of the synchronization range 10 and additional crenels 14 of a lower modulation range 12. The additional teeth 14 of the lower modulation range 12 allow more angles of rotation of the tracked element being driven by the internal combustion engine to be identified than the crenels 13 of the synchronization range 10. The falling edges of the additional crenels 14 are for example located at 0, 90, 180 and 270°.

A better resolution of the sensor because of the presence of the additional crenels 14 is particularly advantageous at low engine speeds, but may become unnecessary at high engine speeds, possibly varying depending on the type of engine, but being for example higher than 3,000 revolutions per minute.

Above a predetermined speed of rotation of the element driven by the engine, the lower and upper ranges 12, 11 of the signal may be suppressed. The synchronization range 10 then occupies the entire voltage range, this possibly illustrating the default mode of an aspect of the present invention.

The rising or falling edges of the additional crenels 14 of each of the lower and upper modulation ranges 12, 11 may be determined by linear interpolation based on a period between two rising edges or two falling edges of two successive crenels 13 in the synchronization voltage range 10.

An obtainment of the rising or falling edges of the additional crenels is dependent on a speed of rotation of the mechanical target, which speed is computed between two falling or rising mechanical edges of two successive crenels 13 located in the synchronization voltage range 10.

Preferably, but in no way limitingly, the speed measurement used to perform the linear interpolation may be carried out from equidistant edges in the synchronization range 10, i.e. during a phase of stable engine speed. The equidistant edges may be parameterized using a parameter of an electrically erasable, programmable read-only memory (EEPROM).

This EEPROM memory may be programmable in order to be able to correspond to the various specifications of a motor-vehicle manufacturer. Falling edges or rising edges may be respectively used for the linear interpolation between the equidistant edges.

The aim of achieving a better magnetic-sensor resolution is to better track the angles of rotation of the tracked element being driven by the internal combustion engine, which element is tracked with a view to controlling or activating a function depending on the angle of rotation of the element.

An aspect of the invention therefore also relates to a method for driving a function related to the internal combustion engine, the method requiring the function to be implemented to be controlled or activated at angles of rotation of the element driven by the engine.

The angles of rotation are identified by the crenels 13 of the synchronization range 10, by the additional crenels 14 of the lower modulation range 12 and by the additional crenels 15 of the upper modulation range 11 during implementation of a method for increasing a resolution of a sensor, this method being such as described above.

Figure 4:
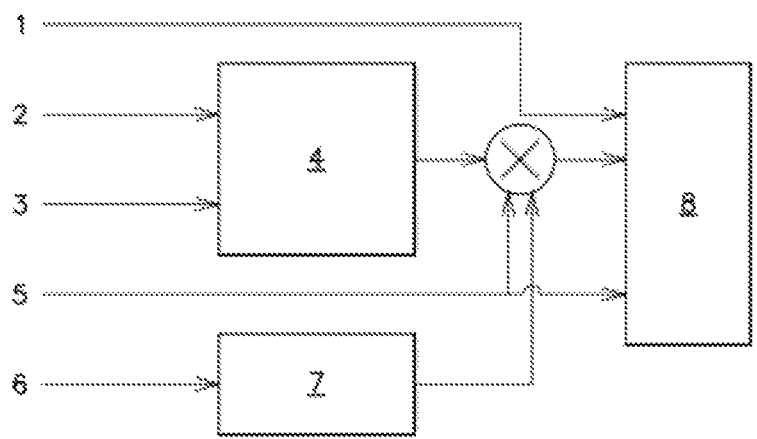
FIG. 4 shows a diagram of regulation of the mass flow rate of air into each cylinder, for a function for activating and controlling variable valve timing according to a method for driving the function according to an aspect of the present invention. It should be borne in mind that the figures are given by way of example and do not limit the invention. They are schematic conceptual representations that are intended to facilitate comprehension of an aspect of the invention and are not necessarily to the scale of practical applications. In particular, the dimensions of the various elements illustrated are not representative of reality.

Referring mainly to FIG. 4, the function may be a variable-valve-timing function that regulates an intake-air flow rate depending on an angle of rotation of at least one camshaft by way of an element driven by the engine.

The parameter referenced 1 is the phase angle of an exhaust valve on the exhaust camshaft associated with an internal combustion engine.

The parameter referenced 2 is the phase angle of an intake valve on the intake camshaft associated with an internal combustion engine.

Reference 3 indicates the inlet pressure and temperature in a cylinder of the internal combustion engine.

Parameters 2 and 3 allow the ideal density per unit volume to be computed in a theoretical computing module 4.

In addition, the external pressure and temperature, which are referenced 6, are taken into account. The external pressure and temperature 6 allow a corrected density per unit volume to be computed in a computing module 7.

Lastly, the engine speed, which is referenced 5, is taken into account. The engine speed 5 is taken into account in the comparison of the ideal density with the corrected density. The engine speed 5 is also taken into account in the computation and regulation of the mass flow rate of air into each cylinder, in a regulating module 8.

By way of the input received by this regulating module 8, on the one hand the setting of the phase angle of an exhaust valve on the exhaust camshaft, which angle was referenced 1 above, and, on the other hand, the comparison of the ideal and corrected densities, are taken into account.

It is obvious that this setting must occur as frequently as possible for various angles of rotation and not only for the angles of rotation identified by the passage of the teeth of the target borne by the camshaft in front of the magnetic sensor.

With reference to all the figures, an aspect of the invention relates to an assembly of at least one magnetic-field sensor, for an internal combustion engine of a motor vehicle, and of an electronic control unit.

The one or more sensors interact with a target comprising an alternating succession of teeth (DC) and of recesses, which target is associated with an element of the internal combustion engine, for example a camshaft or camshafts specific to the intake and the exhaust in the engine.

The or each magnetic-field sensor comprises means for detecting magnetic-field variations induced by the passage of the teeth DC of the target in proximity to the sensor.

Each magnetic sensor comprises means for generating a magnetic signal Smag from said variations and means for periodically transmitting an electrical output signal Ss to the electronic control unit with a view to synchronizing the internal combustion engine.

The assembly implements a method for increasing a resolution of a magnetic sensor or a driving method such as described above.

The or each sensor comprises means for creating two, lower and upper, modulation ranges 12, 11 that bound a synchronization range 10, in its electrical output signal Ss.

In addition, each sensor comprises means for creating, in the electrical signal of each of the lower and upper modulation ranges 12, 11, additional crenels 14, 15, which are supplementary to the crenels 13 of the synchronization signal, with a correspondence between a rising or falling edge and a defined angle of rotation of the element driven by the thermal combustion engine. Each sensor thus comprises means for identifying angles of rotation of the element corresponding to these crenels.

The electronic control unit comprises means for receiving the electrical signal of each of the lower and upper modulation ranges 12, 11, and the angles of rotation identified by the sensor.

The electronic control unit may comprise means for controlling or activating an implemented function at the identified angles of rotation, the implementation of this function being the main object of the methods described above.

This function may be a VVT function for variable-valve-timing of the internal combustion engine of a motor vehicle.

An aspect of the present invention lastly relates to a motor vehicle comprising such an assembly of at least one magnetic-field sensor and of an electronic control unit.

The invention is in no way limited to the embodiments and aspects described and illustrated, which have been given solely by way of example.

The invention claimed is:

1. A method for increasing a resolution of a magnetic-field sensor for an internal combustion engine of a motor vehicle, comprising:

detecting, by the magnetic-field sensor, variations induced by a passage of teeth of a target in proximity to the sensor, the teeth comprising an alternating succession of the teeth and of recesses being associated with an element driven by the internal combustion engine, the detecting including generating a magnetic signal, then periodically delivering an electrical output synchronization signal in a synchronization voltage range, to an electronic control unit, wherein the electrical synchronization signal includes successive, spaced-apart crenels, one of the rising or falling edges of which corresponds to a beginning or an end of the respective passage of a tooth of the target, which occurs at a respective angle of rotation of the element of the engine, wherein the synchronization voltage range is interposed between an upper voltage modulation range above and a lower voltage modulation range below the upper and lower voltage of the synchronization range, respectively, the electrical synchronization signal in each of the lower and upper modulation ranges being modulated so as to comprise additional crenels, which are supplementary to the crenels of the synchronization signal, corresponding to periodic clock crenels with a period dependent on engine speed, an angle of rotation being identified by one of the rising or falling edges of each additional crenel; and controlling, by the control unit, operation of the internal combustion engine based on the electrical synchronization signal.

2. The method as claimed in claim 1, wherein, for a total voltage range of the electrical signal varying from 0 to a maximum voltage, a voltage in the middle of the synchronization range is equal to half the maximum voltage and a voltage in the middle of the lower modulation range is equal to one-third of the maximum voltage while a voltage in the middle of the upper modulation range is equal to two-thirds of the maximum voltage.

3. The method as claimed in claim 1, wherein, above a predetermined speed of rotation of the element driven by the engine, the lower and upper ranges of the signal are suppressed and the synchronization range occupies the entire voltage range.

4. The method as claimed in claim 1, wherein the rising or falling edges of the additional crenels of each of the lower and upper modulation ranges are determined by linear interpolation based on a period between two rising edges or two falling edges of two successive crenels in the synchronization voltage range.

5. The method as claimed in claim 4, wherein an obtainment of the rising or falling edges of the additional crenels is dependent on a speed of rotation of the mechanical target, which speed is computed between falling or rising mechanical edges of two successive crenels in the synchronization voltage range.

6. A method for driving a function related to the internal combustion engine, the method requiring the function to be implemented to be controlled or activated at angles of rotation of the element driven by the engine, wherein the angles of rotation are identified by the crenels of the synchronization range and the additional crenels of the lower and upper modulation ranges during an implementation of a method for increasing a resolution of a sensor as claimed in claim 1.

7. The method as claimed in claim 6, wherein the function is a variable-valve-timing function that regulates an intake-air flow rate depending on an angle of rotation of at least one camshaft by way of an element driven by the engine.

8. An assembly of at least one magnetic-field sensor, for an internal combustion engine of a motor vehicle, and of an electronic control unit, said at least one sensor interacting with a target comprising an alternating succession of teeth and of recesses, which target is associated with an element of the internal combustion engine, and said at least one magnetic-field sensor comprising means for detecting magnetic-field variations induced by the passage of the teeth of the target in proximity to said at least one sensor, comprising means for generating a magnetic signal from said variations and means for periodically transmitting an electrical output signal to the electronic control unit with a view to synchronizing the internal combustion engine, the assembly implementing a method for increasing a resolution of a driving method as claimed in claim 6 wherein said at least one sensor comprises means for creating, for its electrical output signal, two, lower and upper, modulation ranges that bound a synchronization range, and means for creating, in the electrical signal of each of the lower and upper modulation ranges, additional crenels, which are supplementary to the crenels of the synchronization signal, the additional crenels being periodic clock crenels with a period dependent on engine speed, and means for identifying the angles of rotation of the element corresponding to a rising or falling edge of each of the crenels of the synchronization signal and of the additional crenels, the electronic control unit comprising means for receiving the electrical signal of each of the lower and upper modulation ranges, and the angles of rotation identified by the sensor.

9. An assembly of at least one magnetic-field sensor, for an internal combustion engine of a motor vehicle, and of an electronic control unit, said at least one sensor interacting with a target comprising an alternating succession of teeth and of recesses, which target is associated with an element of the internal combustion engine, and said at least one magnetic-field sensor comprising means for detecting magnetic-field variations induced by the passage of the teeth of the target in proximity to said at least one sensor, comprising means for generating a magnetic signal from said variations and means for periodically transmitting an electrical output signal to the electronic control unit with a view to synchronizing the internal combustion engine, the assembly implementing a method for increasing a resolution of a magnetic sensor as claimed in claim 1 wherein said at least one sensor comprises means for creating, for its electrical output signal, two, lower and upper, modulation ranges that bound a synchronization range, and means for creating, in the electrical signal of each of the lower and upper modulation ranges, additional crenels, which are supplementary to the crenels of the synchronization signal, the additional crenels being periodic clock crenels with a period dependent on engine speed, and means for identifying the angles of rotation of the element corresponding to a rising or falling edge of each of the crenels of the synchronization signal and of the additional crenels, the electronic control unit comprising means for receiving the electrical signal of each of the lower and upper modulation ranges, and the angles of rotation identified by the sensor.

10. The assembly as claimed in claim 9, wherein the electronic control unit comprises means for controlling or activating a function implemented at the identified angles of rotation.

11. A motor vehicle, comprising an assembly of at least one magnetic-field sensor and of an electronic control unit as claimed in claim 9.

* * * * *

UNITED STATES PATENT AND TRADEMARK OFFICE
CERTIFICATE OF CORRECTION

PATENT NO. : 11,434,840 B2
APPLICATION NO. : 17/431877
DATED : September 6, 2022
INVENTOR(S) : Denis Bouscaren et al.

It is certified that error appears in the above-identified patent and that said Letters Patent is hereby corrected as shown below:

In the Claims

In Column 10, Line 32, "the-rising" should read -- rising --.

Signed and Sealed this
Twenty-fifth Day of October, 2022

*Katherine Kelly Vidal*

Katherine Kelly Vidal
*Director of the United States Patent and Trademark Office*